US008660183B2

(12) United States Patent
Miyaji et al.

(10) Patent No.: US 8,660,183 B2
(45) Date of Patent: Feb. 25, 2014

(54) MOVING-PICTURE COMPRESSION-ENCODING APPARATUS

(75) Inventors: Satoshi Miyaji, Saitama (JP); Yasuhiro Takishima, Saitama (JP)

(73) Assignee: KDDI Corporation, Tokyo (JP)

( * ) Notice: Subject to any disclaimer, the term of this patent is extended or adjusted under 35 U.S.C. 154(b) by 1294 days.

(21) Appl. No.: 12/254,243

(22) Filed: Oct. 20, 2008

(65) Prior Publication Data

US 2009/0110056 A1 Apr. 30, 2009

(30) Foreign Application Priority Data

Oct. 26, 2007 (JP) ................................. 2007-279020

(51) Int. Cl.
*H04N 7/12* (2006.01)

(52) U.S. Cl.
USPC ................. 375/240.16; 375/240; 375/240.01; 375/240.12

(58) Field of Classification Search
USPC .................. 375/240.16, 240, 240.01, 240.12
See application file for complete search history.

(56) References Cited

U.S. PATENT DOCUMENTS

| | | | | |
|---|---|---|---|---|
| 2,102,671 A * | 12/1937 | Black | | 330/57 |
| 3,342,941 A * | 9/1967 | Kondo | | 370/481 |
| 4,006,315 A * | 2/1977 | Halstead | | 455/41.1 |
| 4,151,475 A * | 4/1979 | von der Neyen | | 375/349 |
| 4,498,060 A * | 2/1985 | Dolby | | 333/14 |
| 5,513,022 A * | 4/1996 | Son et al. | | 359/16 |
| 5,870,046 A * | 2/1999 | Scott et al. | | 341/143 |
| 5,886,742 A * | 3/1999 | Hibi et al. | | 375/240.16 |
| 6,107,948 A * | 8/2000 | Scott et al. | | 341/143 |
| 6,137,827 A * | 10/2000 | Scott et al. | | 375/219 |
| 6,191,717 B1 * | 2/2001 | Scott et al. | | 341/143 |
| 6,225,927 B1 * | 5/2001 | Scott et al. | | 341/110 |
| 6,297,755 B2 * | 10/2001 | Scott et al. | | 341/110 |
| 6,385,235 B1 * | 5/2002 | Scott et al. | | 375/220 |
| 6,389,061 B1 * | 5/2002 | Scott et al. | | 375/220 |
| 6,430,229 B1 * | 8/2002 | Scott et al. | | 375/285 |
| 6,570,513 B2 * | 5/2003 | Scott et al. | | 341/110 |
| 6,611,553 B1 * | 8/2003 | Scott et al. | | 375/220 |
| 6,654,409 B1 * | 11/2003 | Scott et al. | | 375/220 |
| 6,683,548 B2 * | 1/2004 | Scott et al. | | 341/110 |
| 7,072,389 B2 * | 7/2006 | Scott et al. | | 375/220 |
| 7,154,940 B2 * | 12/2006 | Scott et al. | | 375/220 |
| 7,200,167 B2 * | 4/2007 | Scott et al. | | 375/220 |
| 7,203,224 B2 * | 4/2007 | Scott et al. | | 375/220 |
| 2001/0010502 A1 * | 8/2001 | Scott et al. | | 341/143 |
| 2002/0130801 A1 * | 9/2002 | Scott et al. | | 341/143 |
| 2002/0154702 A1 * | 10/2002 | Scott et al. | | 375/257 |
| 2003/0002571 A1 * | 1/2003 | Scott et al. | | 375/219 |
| 2004/0101132 A1 * | 5/2004 | Scott et al. | | 379/412 |
| 2004/0161023 A1 * | 8/2004 | Scott et al. | | 375/219 |
| 2007/0165718 A1 * | 7/2007 | Okazaki | | 375/240.16 |

FOREIGN PATENT DOCUMENTS

JP 2007-194818 8/2007

* cited by examiner

*Primary Examiner* — Bradley Holder
(74) *Attorney, Agent, or Firm* — Westman, Champlin & Koehler, P.A.

(57) ABSTRACT

Re-encoding information indicating whether or not an input moving picture has been compression-encoded is provided to a mode determining unit. The mode determining unit determines an optimal encoding mode for the input moving picture, out of a plurality of encoding modes. The mode determining operation is controlled by the re-encoding information. According to a mode determination result of the mode determining unit, a prediction error value corresponding to the determined mode is selected by a selection switch, and then, an encoding process is performed. As the re-encoding information, a pre-determined value, a bit rate, and a quantization parameter, etc., could be provided.

18 Claims, 3 Drawing Sheets

Fig. 5

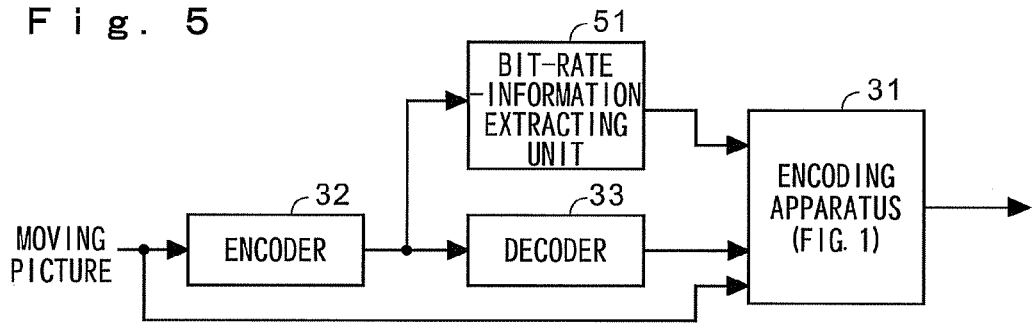

Fig. 6

| sequence_header(){ | No.of bit | Mnemonic |
|---|---|---|
| sequence_header_code | 32 | bslbf |
| horizontal_size_value | 12 | uimsbf |
| vertical_size_value | 12 | uimsbf |
| aspect_ratio_information | 4 | uimsbf |
| frame_rate_code | 4 | uimsbf |
| bit_rate_value | 18 | uimsbf |
| marker_bit | 1 | bslbf |
| vbv_buffer_size_value | 10 | uimsbf |
| constrained_parameters_flag | 1 | bslbf |
| load_intra_quantiser_matrix | 1 | uimsbf |
| if(load_intra_quantiser_matrix) | | |
|     intra_quantiser_matrix[64] | 8*64 | uimsbf |
| load_non_intra_quantiser_matrix | 1 | uimsbf |
| if(load_non_intra_quantiser_matrix) | | |
|     non_intra_quantiser_matrix[64] | 8*64 | uimsbf |
| next_start_code() | | |
| } | | |

Fig. 7

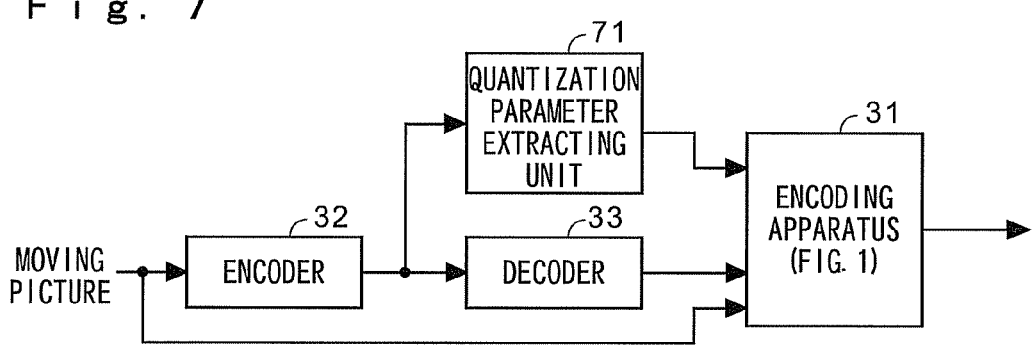

MOVING-PICTURE COMPRESSION-ENCODING APPARATUS

The present application claims priority of Japanese patent application Serial No. 2007-279020, filed Oct. 26, 2007, the content of which is hereby incorporated by reference in its entirety.

BACKGROUND OF THE INVENTION

1. Field of the Invention

The present invention relates to a moving-picture compression-encoding apparatus, and more particularly, relates to a moving-picture compression-encoding apparatus that selectively compression-encodes a moving picture that has not been compression-encoded and a moving picture obtained by decoding a compression-encoded moving picture.

2. Description of the Related Art

To transmit or broadcast a moving picture, there is known a moving-picture compression-encoding apparatus in which an encoding-processed moving picture is decoded, the moving picture obtained thereby is encoded again by another method, and the resultant moving picture is sent out.

Patent Document 1 describes an encoding apparatus in which encoded data encoded by an encoding method using a motion compensation such as MPEG-2 and H.264 is decoded and picture data obtained thereby is encoded again.

This encoding apparatus solves a problem inherent in the conventional technology in which an enormous amount of operations are needed to generate a motion vector at the time of encoding. In this apparatus, motion vector information is taken out from an encoded moving picture applied as a moving picture to be encoded; the motion vector information is compared with a motion vector value on a periphery of a location that is currently encoded; whether the motion vector can be reused is determined according to a magnitude, etc., of a dispersed value; regarding the motion vector determined as reusable, the motion vector is reused; and regarding the motion vector determined as unreusable, the motion vector is generated inside the encoding apparatus.

Thus, at the time of encoding again the moving picture obtained by decoding the encoded moving picture by another encoding method, when the previous motion vector is reused, the amount of operations required for generating the motion vector in the encoding apparatus can be reduced.

[Patent Document 1] Japanese Published Unexamined Patent Application No. 2007-194818

In the encoding apparatus in Patent Document 1, the moving picture obtained by decoding the encoded moving picture is assumed to be input, and under this assumption, it is only intended to reduce the amount of operations for generating the motion vector at the time of encoding by another encoding method.

Even when a moving picture that has not been compressed is input to the encoding apparatus, an encoding process is the same as a case that an encoded moving picture is decoded and input. That is, apart from processes for generating and calculating the motion vector, the same encoding process is performed, irrespective of whether the input moving picture is a moving picture that has not been compression-encoded or a moving picture obtained by decoding the compression-encoded moving picture. Between the moving picture that has not been compression-encoded and the moving picture obtained by decoding the compression-encoded moving picture, a property of the moving picture, such as encoding noise is imparted, is changed.

In the encoding apparatus in Patent Document 1, the encoding process is performed without taking into consideration of the change of the properties of the moving picture, and thus, in each of a case that the moving picture that has not been compression-encoded is input and a case that the moving picture in which the compression-encoded moving picture is decoded is input, an optimal encoding process in which a quality of the encoded picture is taken into consideration is not performed, which is a problem.

SUMMARY OF THE INVENTION

An object of the present invention is to solve the above-described problem and to provide a moving-picture compression-encoding apparatus capable of performing an optimal encoding process in which a quality of an encoded picture is taken into consideration, in each of a case that a moving picture that has not been compression-encoded is input and a case that a moving picture obtained by decoding a compression-encoded moving picture is input.

In order to accomplish the object, the first feature of this invention is that a moving-picture compression-encoding apparatus that selectively compression-encodes a moving picture that has not been compression-encoded and a moving picture obtained by decoding a compression-encoded moving picture, comprises a mode determining means that determines which mode, out of a plurality of encoding modes, is used to encode an input moving picture, by using a mode determining coefficient that serves as a threshold for a mode determination, an encoding means that performs an encoding process on the input moving picture with the mode determined by the mode determining means, an acquiring means that acquires re-encoding information indicating whether or not the input moving picture has been compression-encoded, and a changing means that changes a mode determining operation in the mode determining means, when the re-encoding information acquired by the acquiring means is indicating that the input moving picture has been compression-encoded.

The second feature of this invention is that the changing means changes the mode determining operation by changing a coupling coefficient in rate-distortion optimization control.

The third feature of this invention is that the changing means changes the mode determining operation by changing an amount of side information in the mode determining means.

The fourth feature of this invention is that the re-encoding information acquired by the acquiring means has a value indicating a level of influence of encoding noise incurred as a result of the compression encoding, and the changing means changes the mode determining operation according to the value.

The fifth feature of this invention is that the acquiring means comprises a means that calculates a bit rate by observing a number of bits per unit time from a bit stream when the input moving picture is encoded, and provides the bit rate calculated thereby as the re-encoding information.

The sixth feature of this invention is that the acquiring means comprises a means that resolves a bit rate by taking out an information field indicating a bit rate from a bit stream when the input moving picture is encoded, and provides the bit rate taken out thereby as the re-encoding information.

The seventh feature of this invention is that the acquiring means comprises a means that estimates an encoding noise amount by observing a quantization parameter per frame from a bit stream when the input moving picture is encoded, and provides the encoding noise amount estimated thereby as the re-encoding information.

According to the present invention, encoding control according to the properties of an input moving picture is enabled, and an optimal encoded picture quality can be obtained.

BRIEF DESCRIPTION OF THE DRAWINGS

FIG. 5 is a block diagram showing another configuration when the bit rate is automatically provided as the re-encoding information.

FIG. 6 is a table showing an example of a field including a bit rate, out of a bit stream.

FIG. 7 is a block diagram showing a configuration when an encoding noise amount is automatically provided as the re-encoding information.

DETAILED DESCRIPTION OF THE PREFERRED EMBODIMENTS

Figure 1:
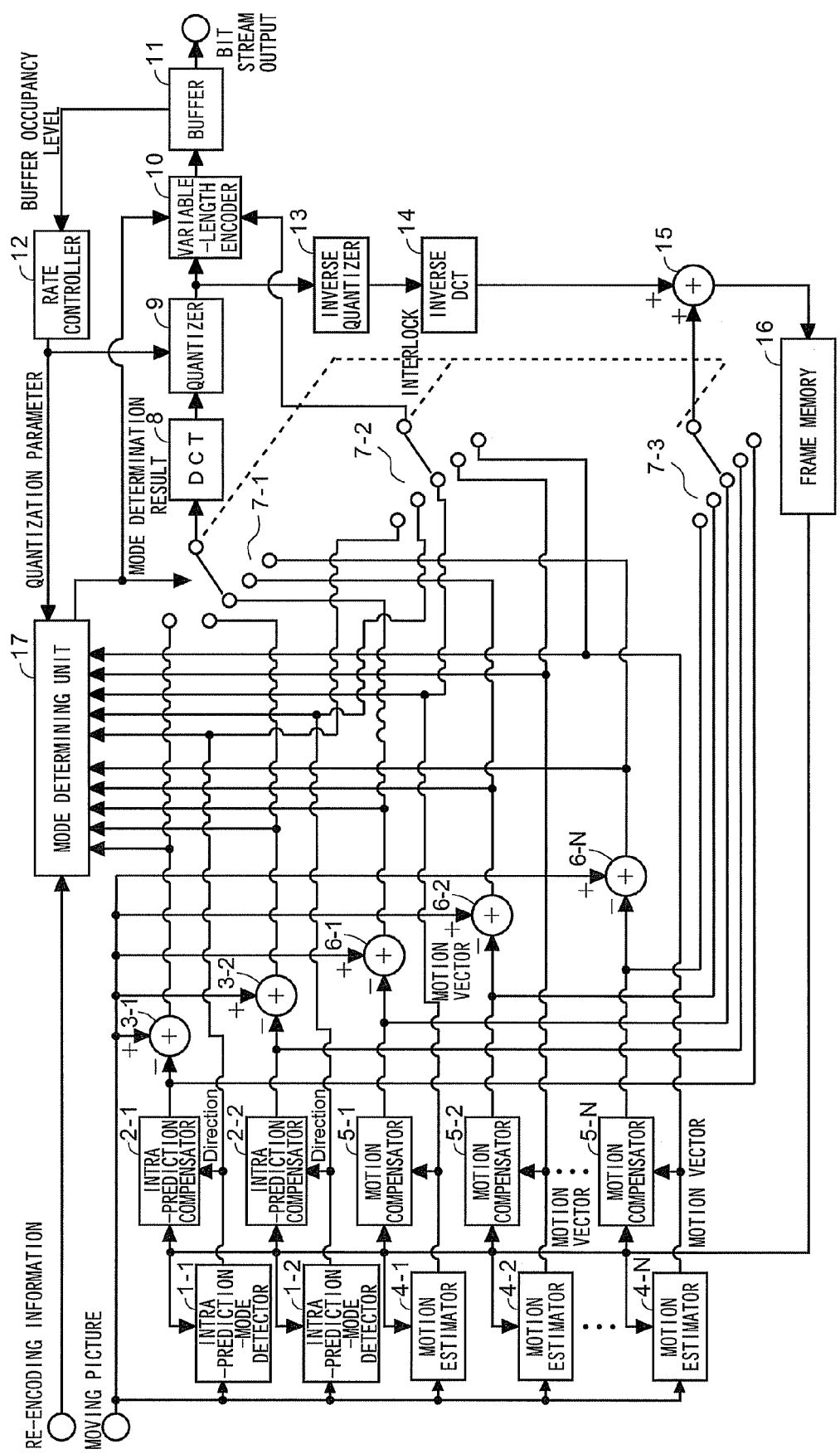
FIG. 1 is a block diagram showing one embodiment of a moving-picture compression-encoding apparatus according to the present invention.

With reference to drawings, the present invention will be described below. FIG. 1 is a block diagram showing one embodiment of a moving-picture compression-encoding apparatus according to the present invention. Hereinafter, the present invention is described by using an example of a moving-picture compression-encoding apparatus that performs an encoding process according to ITU-TH.264, which is one of the international standard methods for a moving picture encoding.

The moving-picture compression-encoding apparatus of the present embodiment is provided with: Intra-prediction-mode detectors 1-1 and 1-2; Intra-prediction compensators 2-1 and 2-2; motion detectors 4-1, 4-2, . . . , and 4-N; motion compensators 5-1, 5-2, . . . , and 5-N; subtractors 3-1, 3-2, 6-1, 6-2, . . . , and 6-N; selection switches 7-1, 7-2, and 7-3; a DCT unit 8; a quantizing 9; a variable-length encoder 10; a buffer 11; a rate controller 12; an inverse quantizer 13; an inverse DCT unit 14; an adder 15; a frame memory 16; and a mode determining unit 17.

In the H.264, the Intra prediction has a mode in which a block unit is 16×16 and a mode in which the block unit is 4×4. Thus, in this case, in order to correspond to these modes, there are arranged the two Intra-prediction-mode detectors 1-1 and 1-2, Intra-prediction compensators 2-1 and 2-2, and subtractors 3-1 and 3-2. In the motion detection, there are modes in which the block units are 16×16, 8×16, 16×8, and 8×8, and there are modes in which these block units are further segmented. Thus, in this case, in order to correspond to these modes, there are arranged N motion detectors 4-1, 4-2, . . . , and 4-N, motion compensators 5-1, 5-2, . . . , and 5-N, and subtractors 6-1, 6-2, . . . , and 6-N.

A moving picture to be encoded is input to the Intra-prediction-mode detectors 1-1 and 1-2 and the motion detectors 4-1, 4-2, . . . , and 4-N. Macroblocks (16×16) in each frame of an input moving picture signal are subjected to the following processes.

The Intra-prediction-mode detectors 1-1 and 1-2 use a local decoded picture from the frame memory 16 to perform an Intra-prediction-mode detection on each block size mode (1 of 16×16 or 16 of 4×4) so as to evaluate a prediction direction (Direction) in which a prediction error in the Intra prediction is minimized.

The Intra-prediction compensators 2-1 and 2-2 use the Directions evaluated in the Intra-prediction-mode detectors 1-1 and 1-2 to perform an Intra prediction compensation on the local decoded picture from the frame memory 16, and applies the resultant picture to the subtractors 3-1 and 3-2.

The subtractors 3-1 and 3-2 evaluate a prediction error value between the moving picture to be encoded, which is input, and the local decoded pictures Intra-prediction-compensated in the Intra-prediction compensators 2-1 and 2-2.

On the other hand, the motion detectors 4-1, 4-2, . . . , and 4-N use the local decoded picture from the frame memory 16 to perform a motion detection in each block unit so as to evaluate a motion vector in which a prediction error in the motion predicting process is minimized.

The motion compensators 5-1, 5-2, . . . , and 5-N use the motion vectors evaluated by the motion detectors 4-1, 4-2, . . . , and 4-N so as to motion-compensate the local decoded picture from the frame memory 16, and apply the resultant pictures to the subtractors 6-1, 6-2, . . . , and 6-N.

The subtractors 6-1, 6-2, . . . , and 6-N evaluate a prediction error value between the moving picture to be encoded, which is input, and the local decoded pictures motion-compensated by the motion compensators 5-1, 5-2, . . . , and 5-N.

The selection switch 7-1 selects one of the prediction error value evaluated in the subtractors 3-1, 3-2, 6-1, 6-2, . . . , and 6-N, and applies the selected prediction error value to the DCT unit 8. The selection switch 7-2 selects one of the Directions evaluated in the Intra-prediction-mode detectors 1-1 and 1-2 and the motion vectors evaluated in the motion detectors 4-1, 4-2, . . . , and 4-N, and applies the same to the variable-length encoder 10. The selection switch 7-3 selects one of the prediction-compensated local decoded pictures evaluated in the Intra-prediction compensators 2-1 and 2-2 and the motion compensators 5-1, 5-2, . . . , and 5-N, and applies the selected picture to the adder 15.

The selection switches 7-1, 7-2, and 7-3 are switched to those compatible to the respective modes according to and in association with a mode determination result in the mode determining unit 17. The mode determining process in the mode determining unit 17 is described later.

The DCT unit 8 converts the prediction error value selected in the selection switch 7-1 into a DCT coefficient. The quantizer 9 quantizes the DCT coefficient. The variable-length encoder 10 applies a variable-length encoding to the DCT coefficient quantized in the quantizer 9, the motion vector, the Intra prediction Direction, and the mode information, and outputs as a bit stream. The buffer 11 buffers the bit stream variable-length-encoded in the variable-length encoder 10, and outputs the same at a predetermined rate.

The rate controller 12 monitors upward and downward movements of an occupancy amount of an information amount in the buffer 11, and determines a quantization parameter (QP) in the quantizer 9 so that its occupancy amount remains constant. Herein, when the QP is larger, a rough quantization is performed, and thus, the information amount decreases, and when the QP is smaller, a fine quantization is performed, and thus, the information amount increases. Further, the quantization parameter (QP) is also provided to the mode determining unit 17.

The DCT coefficient quantized in the quantizer 9 is inversely quantized in the inverse quantizer 13, and further, inversely converted in the inverse DCT unit 14. The resultant coefficient results in a prediction error value. The adder 15 adds the prediction error value obtained by the inverse conversion to the corresponding local decoded pictures from the Intra-prediction compensators 2-1 and 2-2 and the motion compensators 5-1, 5-2, . . . , and 5-N so as to generate a new local decoded picture. The local decoded picture of the frame memory 16 is updated to the new local decoded picture.

The mode determining unit 17 determines the optimal prediction mode in the encoding process based on the prediction error value each evaluated in the motion prediction mode and the Intra prediction mode, the corresponding Direction and motion vector, the re-encoding information and the quantization parameter (QP), and applies the mode determination result to the selection switches 7-1, 7-2, and 7-3, and the variable-length encoder 10.

The selection switches 7-1, 7-2, and 7-3 are switched according to and in association with the mode determination result from the mode determining unit 17. The variable-length encoder 10 performs a variable-length encoding, together with the mode determination result from the mode determining unit 17 and the Direction from the selection switch 7-2 or the DCT coefficient obtained by quantizing the motion vector.

Figure 2:
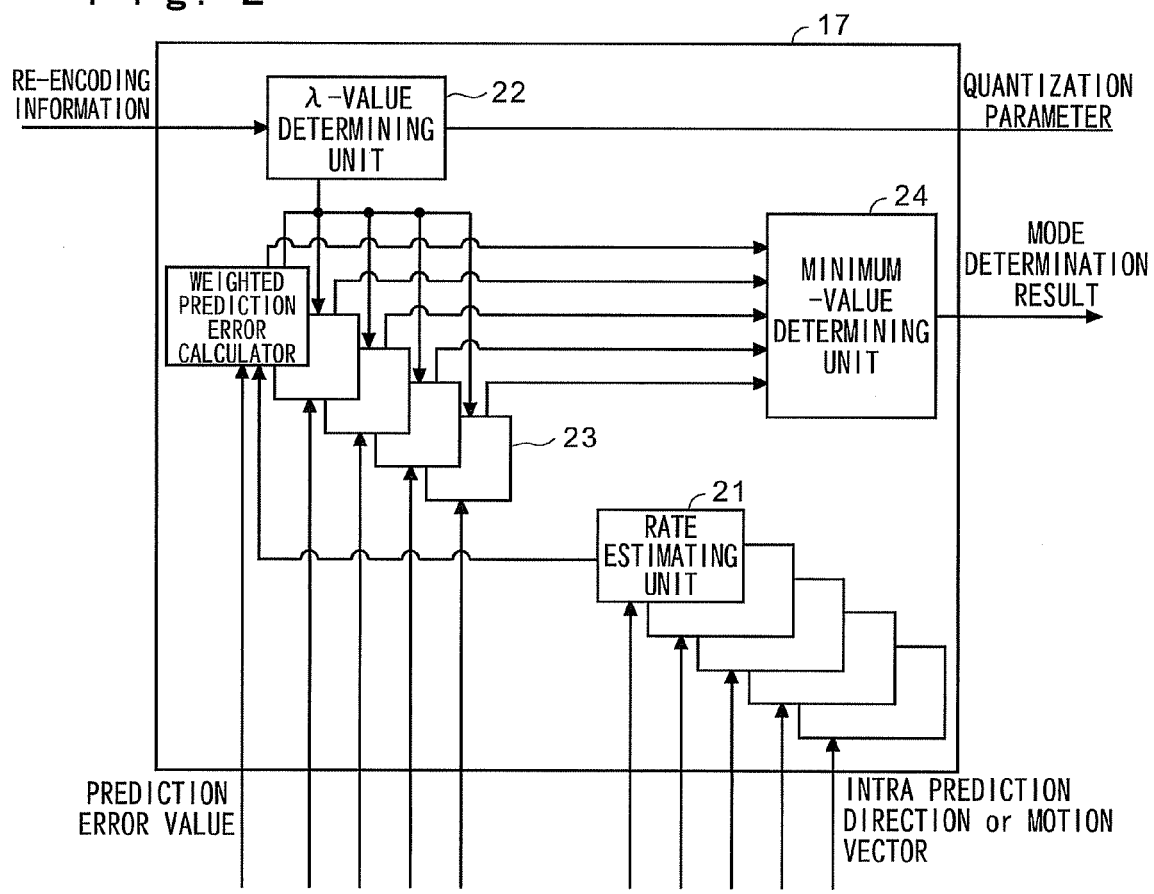
FIG. 2 is a block diagram showing in detail a mode determining unit.

Subsequently, the mode determining process in the mode determining unit 17 is described. FIG. 2 is a block diagram showing in detail a configuration of the mode determining unit 17, which is provided with: a rate estimating unit 21; a λ-value determining unit 22; an evaluation-value calculator 23; and a minimum-value determining unit 24.

The rate estimating unit 21 is input the Directions evaluated in the Intra-prediction-mode detectors 1-1 and 1-2 and the motion vectors evaluated in the motion detectors 4-1, 4-2, . . . , and 4-N so as to estimate an information amount required for transmitting those information (the Directions and the motion vectors), and uses this value as a numerical value R and sends out to the evaluation-value calculator 23. The λ-value determining unit 22 sends out a numerical value λ changed according to the re-encoding information, to the evaluation-value calculator 23.

The evaluation-value calculator 23 calculates a sum of absolute values and a sum of squares with respect to the prediction error value each evaluated in the motion prediction mode and the Intra prediction mode, and holds these sums as a numerical value D. The evaluation-value calculator 23 further uses the numerical value D, the numerical value R sent out from the rate estimating unit 21, and the numerical value λ sent out from the λ-value determining unit 22 so as to calculate a numerical value E according to Equation (1):

$$E=D+\lambda R \tag{1}$$

Equation (1) is an equation for rate-distortion optimization control (R-D optimization control), and expresses that when the numerical value E is minimized, an optimization state is achieved. That is, the numerical value E means a mode determining coefficient that serves as a threshold for determining which mode, out of a plurality of encoding modes, is used to encode the input moving picture. That is, the numerical value E calculated by Equation (1) serves as a threshold on which to base an optimized state determination in which not only is the prediction error value D minimized but also a value that takes into consideration the information amount R required for transmitting the side information (the Direction and the motion vector) is minimized. The numerical value λ is a coupling coefficient in the rate-distortion optimization control in which to estimate a level of the information amount R required for transmitting the side information in that case.

The minimum-value determining unit 24 determines the numerical value E, which is calculated in the evaluation-value calculator 23 and is a minimum out of the numerical values E in the respective modes, and outputs, as the mode determination result, a mode that gives the minimum numerical value E.

The λ-value determining unit 22 is provided "∞", for example, as the re-encoding information, when the moving picture to be encoded has not been compression-encoded or even when the moving picture to be encoded, which is once encoded, is extremely low in a compression rate (that is equal to a case where no compression has been performed). Further, when the moving picture to be encoded is once compression-encoded, an appropriate value between "0" and "∞" is provided as the re-encoding information. Herein, the value "∞" means a maximum value (in a case of an unsigned 16-bit integer, for example, 65535) in a numerical value type used in a digital circuit.

In the rate-distortion optimization control, generally, $0.85 \times 2^{(QP/3)}$ is used as the numerical value λ. When the re-encoding information is "∞", the λ-value determining unit 22 does not change the numerical value λ while keeping it as $0.85 \times 2^{(QP/3)}$. Alternatively, when the re-encoding information is a value between "0" and "∞", which indicates that the moving picture to be encoded has been compression-encoded, the λ-value determining unit 22 changes the numerical value to λ value smaller than $0.85 \times 2^{(QP/3)}$.

When the moving picture to be encoded has been compression-encoded (except that the compression rate is extremely low), there is a tendency that the higher the compression rate, the more encoding noise there is in the moving picture to be encoded and the larger the numerical value D indicating a prediction error. In this case, it is desired to perform the mode determination in terms of minimizing the numerical value D in a manner that an influence of the numerical value R on the numerical value E is relatively small. Thus, when the numerical value λ is smaller to reduce a consideration of the numerical vale R in Equation (1) the optimal control may result.

On the other hand, when the moving picture to be encoded has not been compression-encoded or even when it is once encoded, its compression rate is extremely low, there is a tendency that the encoding noise in the moving picture to be encoded is reduced and the numerical value D indicating the prediction error is small. In this case, the influence of the numerical value R on the numerical value E cannot be ignored, and thus, there is a need for sufficiently taking into consideration the numerical value R in Equation (1) and it is preferable that the numerical value λ be a value equivalent to an encoding apparatus that handles a normal unencoded picture as an input picture.

When the moving picture to be encoded has been compression-encoded, a value of a bit rate equivalent to encoding noise in the encoding process indicates a level of the encoding noise, i.e., the smaller the bit rate, the larger the encoding noise. Thus, it is preferable that the numerical value λ be changed toward a smaller direction as the value of the bit rate becomes smaller.

Thus, the λ-value determining unit 22 does not change the numerical value λ when the re-encoding information is the value "∞" that indicates that the moving picture to be encoded has not been compression-encoded or the compression rate is extremely low. On the other hand, the λ-value determining unit 22 changes the numerical value λ to a smaller value according to the degree of compression when the re-encoding information is a value that indicates that the moving picture to be encoded has been compression-encoded. The λ-value determining unit 22 changes the numerical value λ toward a smaller direction as its value becomes smaller when as the re-encoding information, the value of the bit rate at the time of the moving picture to be encoded being encoded is input, and the λ-value determining unit 22 rarely changes the numerical value λ when the value is larger than a certain threshold value.

In this way, when the bit rate value indicating an amount of encoding noise in the moving picture to be encoded is used as the re-encoding information, the threshold on which to base the mode determination in the mode determining unit 17 is more finely and optimally set according to a properties of the moving picture to be encoded, and in this state, the optimization control is to be performed.

The change of the λ value may be performed by one of: setting only once at the time of a start of the encoding operation; setting at a predetermined time interval; and setting in a frame unit.

Subsequently, the re-encoding information provided to the λ-value determining unit 22 is described. The re-encoding information is that which indicates whether or not the input moving picture has been compression-encoded, or the degree of compression when the moving picture has been compression-encoded. The λ-value determining unit 22 could be provided a pre-determined value, as the re-encoding information, and could also be provided a bit rate obtained from a bit stream at the time of being encoded. Alternatively, the encoding noise amount estimated from the input picture could also be provided.

Figure 3:
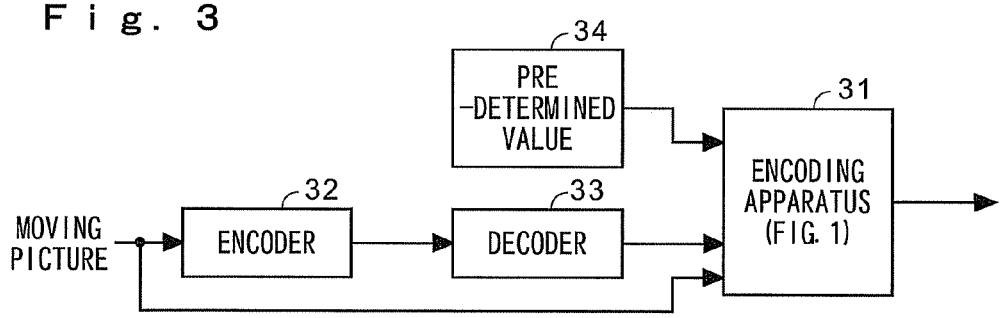
FIG. 3 is a block diagram showing a configuration when a pre-determined value is provided as re-encoding information.

FIG. 3 is a block diagram showing a configuration when the λ-value determining unit 22 is provided the pre-determined value, as the re-encoding information. The encoding apparatus 31 is configured according to the present invention, and is input, as the moving picture to be encoded, the moving picture that has not been compression-encoded, or the moving picture once encoded in the encoder 32 and thereafter decoded in the decoder 33.

The encoding apparatus 31 (the λ-value determining unit 22 (FIG. 2)) is provided a pre-determined value as the re-encoding information. The pre-determined value is a binary of a maximum value (in a case of 16 bits, 65535), for example, when the moving picture that has not been compression-encoded is input to the encoding apparatus 31, and a binary of a minimum value (0), for example, when the moving picture that has been compression-encoded is input thereto. The encoding apparatus 31 (λ-value determining unit 22) does not change the numerical value λ when the pre-determined value "65535" is provided as the re-encoding information, but changes the numerical value λ to a smaller value when the pre-determined value "0" is provided. When the moving picture that has been compression-encoded is input, the bit rate at the time of being encoded could also be provided as the pre-determined value, and when the pre-determined value is smaller than a predetermined threshold value, the numerical value λ may be changed toward a smaller direction, and when the pre-determined value is larger, the numerical value λ rarely changes.

Figure 4:
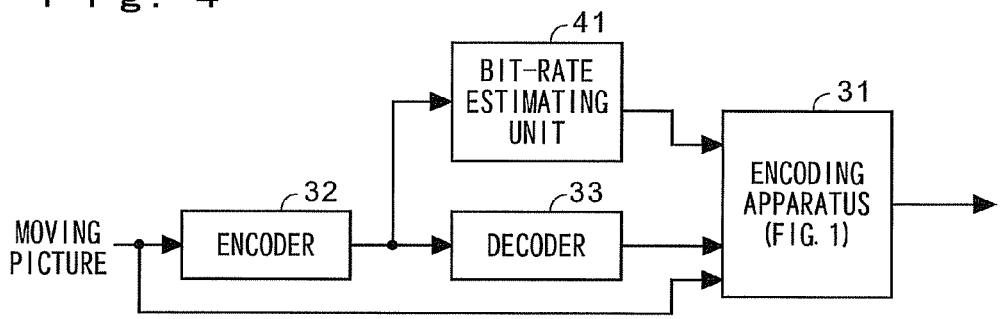
FIG. 4 is a block diagram showing a configuration when a bit rate is automatically provided as re-encoding information.

FIG. 4 is a block diagram showing a configuration when the λ-value determining unit 22 is automatically provided the bit rate, as the re-encoding information. The same reference numerals are assigned to the same or equivalent portions as those in FIG. 3. The operations of the encoding apparatus 31, the encoder 32, and the decoder 33 are the same as those in FIG. 3, and thus, the description is omitted.

The bit-rate estimating unit 41 estimates a bit rate from an information amount per unit time of the bit stream encoded by the encoder 32. To estimate the bit rate, it is possible to adopt a technique in which the information amount of the input bit stream is integrated, and the information amount integrated thereby is divided by an integration time to be translated in an information amount per second. In addition thereto, when this operation is performed multiple times so as to evaluate the average, precision or stability of the bit-rate estimate may be increased. The bit rate estimated by the bit-rate estimating unit 41 is provided to the encoding apparatus 31 (λ-value determining unit 22) as the re-encoding information.

The encoding apparatus 31 (λ-value determining unit 22) is provided, as the re-encoding information, the maximum value (in a case of a 16-bit unsigned, 65535) when the moving picture that has not been compression-encoded, as the moving picture to be encoded, is input, or even when the moving picture to be encoded is once encoded but the compression rate is extremely low (equal to a case that no compression has been performed).

The encoding apparatus 31 (λ-value determining unit 22) does not change the numerical value λ when the maximum value is provided as the re-encoding information. However, when the value of the bit rate obtained from the bit stream at the time of being encoded is provided as the re-encoding information, if the value is small, the encoding apparatus 31 (λ-value determining unit 22) changes the numerical value λ toward a smaller direction, and if the value is large, rarely changes the numerical value λ.

FIG. 5 is a block diagram showing another configuration when the λ-value determining unit 22 is automatically provided the bit rate, as the re-encoding information. The same reference numerals are assigned to the same or equivalent portions as those in FIG. 3. The operations of the encoding apparatus 31, the encoder 32, and the decoder 33 are the same as those in FIG. 3, and thus, the description is omitted.

A bit-rate-information extracting unit 51 extracts bit-rate information from the bit stream encoded in the encoder 32. In the extraction of the bit-rate information from the bit stream, the bit-rate information may be taken out from a field including a bit rate out of the bit stream. The bit-rate information taken out in the bit-rate-information extracting unit 51 is provided to the encoding apparatus 31 (1-value determining unit 22) as the re-encoding information.

FIG. 6 shows an example of the field including the bit rate. The present example shows sequence header information out of the bit stream in a case of ISO/IEC 13818-2 (MPEG-2 Video), and the bit-rate information (bit_rate_value) is included in 18 bits from a 64th bit from a head of the sequence header information. In a case of this example, the bit-rate-information extracting unit 51 takes out the bit-rate information (bit_rate_value). In the MPEG-2 Video, this information is written in a unit of 400-bit/s, and thus, the actual bit rate needs to be 400 times the value in this field.

The encoding apparatus 31 (λ-value determining unit 22) is provided, as the re-encoding information, the maximum value (in a case of a 16-bit unsigned, 65535) when the moving picture that has not been compression-encoded as the moving picture to be encoded is input, or even when the moving picture to be encoded is once encoded but the compression rate is extremely low (equal to a case that no compression has been performed).

The encoding apparatus 31 (λ-value determining unit 22) does not change the numerical value λ when the maximum value is provided as the re-encoding information. However, when the value of the bit rate obtained from the bit stream at the time of being encoded is provided as the re-encoding information, if the value is small, the encoding apparatus 31 (λ-value determining unit 22) changes the numerical value λ toward a smaller direction, and if the value is large, rarely changes the numerical value λ.

FIG. 7 is a block diagram showing another configuration when the λ-value determining unit 22 is automatically provided the bit rate, as the re-encoding information. The same reference numerals are assigned to the same or equivalent portions as those in FIG. 3. The operations of the encoding apparatus 31, the encoder 32, and the decoder 33 are the same as those in FIG. 3, and thus, the description is omitted.

A quantization-parameter extracting unit 71 extracts the quantization parameter from the bit stream encoded in the encoder 32. The quantization parameter serves as an index indicating a level of the compression performed on the bit stream. A large quantization parameter means that a rough quantization is performed and its picture contains a large amount of encoding noise, and a small quantization parameter means that a fine quantization is performed and its picture contains less quantization noise. In a method for extracting the quantization parameter, the extraction is performed in a normal macro block (16×16) unit, and thereafter, an average value for each frame is evaluated, or one quantization parameter is extracted in a frame and thereafter, its value is used. The value of the quantization parameter extracted in the quantization-parameter extracting unit 71 is provided to the encoding apparatus 31 ($\lambda$-value determining unit 22) as the re-encoding information.

The encoding apparatus 31 ($\lambda$-value determining unit 22) does not change the numerical value $\lambda$ when the maximum value is provided as the re-encoding information. However, when the value of the quantization parameter obtained from the bit stream at the time of being encoded as the re-encoding information is provided, if the value is large, the encoding apparatus 31 changes the numerical value $\lambda$ toward a smaller direction, regarding as a picture with a large amount of encoding noise, i.e., a picture having a high compression rate, and if the value of the quantization parameter is small, rarely changes the numerical value $\lambda$.

Thus, the embodiment is described. The present invention is not limited to the above-described embodiment and may be modified in various ways. For example, the information amount required for transmitting the side information (the Direction and the motion vector) for each mode may also be statistically evaluated from a block size, etc. Thus, rather than using the rate estimating unit, the $\lambda$-value determining unit, and the evaluation-value calculator as in the above-described embodiment (FIG. 2), the mode determining coefficient may be evaluated. In this case, a sum of absolute values or a sum of squares each with respect to the prediction error value each evaluated in the motion prediction mode and the Intra prediction mode, and the information amount (constant number) of the side information evaluated statistically in each mode may be added to be used as a mode determining coefficient E. In a case of such an embodiment, the change of the $\lambda$-value corresponds to a change of the information amount (constant number) of the above-described side information.

What is claimed is:

1. A moving-picture compression-encoding apparatus that selectively compression-encodes a moving picture that has not been compression-encoded and a moving picture obtained by decoding a compression-encoded moving picture, comprising:
    a mode determining unit, implemented by a hardware processor, that determines which mode, out of a plurality of encoding modes, is used to encode an input moving picture, by using a mode determining coefficient that serves as a threshold for a mode determination;
    an encoding unit, implemented by the processor, that performs an encoding process on the input moving picture with the mode determined by the mode determining unit;
    an acquiring unit, implemented by the processor, that acquires re-encoding information indicating whether or not the input moving picture has been compression-encoded; and
    a changing unit, implemented by the processor, that changes a mode determining operation in the mode determining unit according to the re-encoding information acquired by the acquiring unit; wherein the changing unit sets up the mode determining operation as a level of influence of information amount used for transmitting a side information containing prediction direction and where a motion vector is a value utilized with the re-encoding information acquired by the acquiring unit indicating that the input moving picture has not been compression-encoded and changing the mode determining operation so that the level becomes smaller than the value according to degree of compression when the re-encoding information is indicating that the input moving picture has been compression-encoded.

2. The moving-picture compression-encoding apparatus according to claim 1, wherein the changing unit changes the mode determining operation by changing a coupling coefficient in rate-distortion optimization control.

3. The moving-picture compression-encoding apparatus according to claim 2, wherein the re-encoding information acquired by the acquiring unit has a value indicating a level of influence of encoding noise incurred as a result of the compression encoding, and the changing unit changes the mode determining operation according to the value.

4. The moving-picture compression-encoding apparatus according to claim 3, wherein the acquiring unit comprises a unit that calculates a bit rate by observing a number of bits per unit time from a bit stream when the input moving picture is encoded, and provides the bit rate calculated thereby as the re-encoding information.

5. The moving-picture compression-encoding apparatus according to claim 3, wherein the acquiring unit comprises a unit that resolves a bit rate by taking out an information field indicating a bit rate from a bit stream when the input moving picture is encoded, and provides the bit rate taken out thereby as the re-encoding information.

6. The moving-picture compression-encoding apparatus according to claim 3, wherein the acquiring unit comprises a unit that estimates an encoding noise amount by observing a quantization parameter per frame from a bit stream when the input moving picture is encoded, and provides the encoding noise amount estimated thereby as the re-encoding information.

7. The moving-picture compression-encoding apparatus according to claim 1, wherein the changing unit changes the mode determining operation by changing an amount of side information in the mode determining unit.

8. The moving-picture compression-encoding apparatus according to claim 7, wherein the re-encoding information acquired by the acquiring unit has a value indicating a level of influence of encoding noise incurred as a result of the compression encoding, and the changing unit changes the mode determining operation according to the value.

9. The moving-picture compression-encoding apparatus according to claim 8, wherein the acquiring unit comprises a unit that calculates a bit rate by observing a number of bits per unit time from a bit stream when the input moving picture is encoded, and provides the bit rate calculated thereby as the re-encoding information.

10. The moving-picture compression-encoding apparatus according to claim 8, wherein the acquiring unit comprises a unit that resolves a bit rate by taking out an information field indicating a bit rate from a bit stream when the input moving picture is encoded, and provides the bit rate taken out thereby as the re-encoding information.

11. The moving-picture compression-encoding apparatus according to claim 8, wherein the acquiring unit comprises a unit that estimates an encoding noise amount by observing a quantization parameter per frame from a bit stream when the input moving picture is encoded, and provides the encoding noise amount estimated thereby as the re-encoding information.

12. The moving-picture compression-encoding apparatus according to claim 1, wherein the re-encoding information acquired by the acquiring unit has a value indicating a level of influence of encoding noise incurred as a result of the compression encoding, and the changing unit changes the mode determining operation according to the value.

13. The moving-picture compression-encoding apparatus according to claim 12, wherein the acquiring unit comprises a unit that calculates a bit rate by observing a number of bits per unit time from a bit stream when the input moving picture is encoded, and provides the bit rate calculated thereby as the re-encoding information.

14. The moving-picture compression-encoding apparatus according to claim 12, wherein the acquiring unit comprises a unit that resolves a bit rate by taking out an information field indicating a bit rate from a bit stream when the input moving picture is encoded, and provides the bit rate taken out thereby as the re-encoding information.

15. The moving-picture compression-encoding apparatus according to claim 12, wherein the acquiring unit comprises a unit that estimates an encoding noise amount by observing a quantization parameter per frame from a bit stream when the input moving picture is encoded, and provides the encoding noise amount estimated thereby as the re-encoding information.

16. A moving-picture compression-encoding method that selectively compression-encodes a moving picture that has not been compression-encoded and a moving picture obtained by decoding a compression-encoded moving picture, comprising:
determining which mode, out of a plurality of encoding modes, is used to encode an input moving picture, by using a mode determining coefficient that serves as a threshold for a mode determination;
encoding the input moving picture with the determined mode;
acquiring re-encoding information indicating whether or not the input moving picture has been compression-encoded; and
changing a mode determining operation in the determining according to the acquired re-encoding information; wherein
the determining, the encoding, the acquiring and the changing are performed by a processor; and
the changing sets up the mode determining operation as a level of influence of information amount used for transmitting a side information containing prediction direction and where a motion vector is a value utilized with the re-encoding information acquired by the acquiring unit indicating that the input moving picture has not been compression-encoded and changing the mode determining operation so that the level becomes smaller than the value according to degree of compression when the acquired re-encoding information is indicating that the input moving picture has been compression-encoded.

17. The moving picture compression-encoded method according to claim 16, wherein the changing changes the mode determining operation by changing a coupling coefficient in rate-distortion optimization control.

18. The moving-picture compression-encoding method according to claim 16, wherein the changing changes the mode determining operation by changing an amount of side information in the mode-determining-unit.

* * * * *